(12) United States Patent
Lu et al.

(10) Patent No.: US 6,845,546 B1
(45) Date of Patent: Jan. 25, 2005

(54) HINGE ASSEMBLY WITH A ROTATION SEAT AVAILABLE TO ROTATE IN BOTH LATITUDINAL AND LONGITUDINAL DIRECTIONS WITH RESPECT TO A FIXING SEAT

(75) Inventors: Sheng-Nan Lu, Shulin (TW); Tien-Yueh Hsu, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 74 days.

(21) Appl. No.: 10/601,153

(22) Filed: Jun. 20, 2003

(51) Int. Cl.$^7$ ................................................. E05D 3/10
(52) U.S. Cl. ............................. 16/367; 16/331; 16/374; 16/334; 248/917
(58) Field of Search .......................... 16/367, 331, 332, 16/334, 381, 387, 374, 375, 328, 351, 342; 248/291.1, 291.2, 291.3, 291.4, 919–923; 361/680–683

(56) References Cited

U.S. PATENT DOCUMENTS

| | | | | |
|---|---|---|---|---|
| 606,415 A | * | 6/1898 | Hotaling | 16/351 |
| 2,843,873 A | * | 7/1958 | Slower | 16/331 |
| 4,501,045 A | * | 2/1985 | Boyer | 16/331 |
| 4,829,633 A | * | 5/1989 | Kassner | 16/322 |
| 6,256,837 B1 | * | 7/2001 | Lan et al. | 16/334 |
| 6,268,997 B1 | * | 7/2001 | Hong | 361/681 |
| 6,389,643 B1 | * | 5/2002 | Lim et al. | 16/271 |
| 6,427,288 B1 | * | 8/2002 | Saito | 16/361 |
| 6,742,221 B2 | * | 6/2004 | Lu et al. | 16/367 |

FOREIGN PATENT DOCUMENTS

| | | | | |
|---|---|---|---|---|
| JP | 11257343 A | * | 9/1999 | F16C/11/10 |
| JP | 2002155923 A | * | 5/2002 | F16C/11/04 |

* cited by examiner

Primary Examiner—Chuck Y. Mah
(74) Attorney, Agent, or Firm—Alan D. Kamrath; Nikolai & Mersereau, P.A.

(57) ABSTRACT

A hinge assembly includes a fixing seat and a rotation seat rotatable in relation to the fixing seat. The fixing seat has a fixing plate for connection to a mainframe of an electronic device, a rotation shaft securely connected to the fixing plate and having a limiting flange formed on a mediate portion of the rotation shaft, and a limiting disk securely mounted on the rotation shaft and having two limiting edges. The rotation seat has a body rotatably mounted on the rotation shaft and having two connection legs each rotatably received in two tubes and an extension to selectively engage with either one of the limiting edges to limit a rotation angle of the body to the fixing plate and leaf springs mounted on the rotation shaft.

7 Claims, 6 Drawing Sheets

HINGE ASSEMBLY WITH A ROTATION SEAT AVAILABLE TO ROTATE IN BOTH LATITUDINAL AND LONGITUDINAL DIRECTIONS WITH RESPECT TO A FIXING SEAT

BACKGROUND OF THE INVENTION

1. Field of the Invention

The present invention relates to a hinge assembly, and more particularly to a hinge assembly having a fixing seat and a rotation seat which is able to rotate in both the longitudinal and latitudinal directions with respect to the fixing seat.

2. Description of Related Art

Hinge devices have been used in many different structures to combine two objects together and to allow one object to pivot or rotate with respect to the other object. The existing hinge assemblies provide the ability for one object to pivot relative to the other object in only one direction. For example, the hinge used in a laptop computer to combine the monitor and the mainframe can only provide the monitor to pivot in the longitudinal direction in relation to the mainframe. Another example is the hinge device used in a camera. In a camera, the screen should be rotated freely to enable the operator to have the best angle to shoot the scene. However, with the conventional, the screen can only have latitudinal direction rotation ability when referring to the mainframe of the camera. Even though some manufacturers doprovide a hinge device to provide one object to pivot relative to the other object in both the latitudinal and longitudinal directions, because there is no limitation to the rotation angle, structural damage is inevitable.

To overcome the shortcomings, the present invention tends to provide an improved hinge assembly to mitigate the aforementioned problems.

SUMMARY OF THE INVENTION

The primary objective of the present invention is to provide an improved hinge assembly having a fixing seat for fixing onto a first object and a rotation seat for fixing onto a second object which is pivotable to the first object. The rotation seat of the hinge device is able to rotate in a latitudinal direction with respect to the fixing seat. Also, two connection feet in the rotation seat are able to rotate in a longitudinal direction relative to the fixing seat such that a greater rotation angle is acquired for the operator.

Another objective of the present invention is to provide a positioning device between the fixing seat and the rotation seat so that when the rotation seat is rotated with respect to the fixing seat, the positioning device is able to provide a temporary positioning effect to the rotation seat.

Other objects, advantages and novel features of the invention will become more apparent from the following detailed description when taken in conjunction with the accompanying drawings.

DETAILED DESCRIPTION OF THE PREFERRED EMBODIMENT

Figure 1:
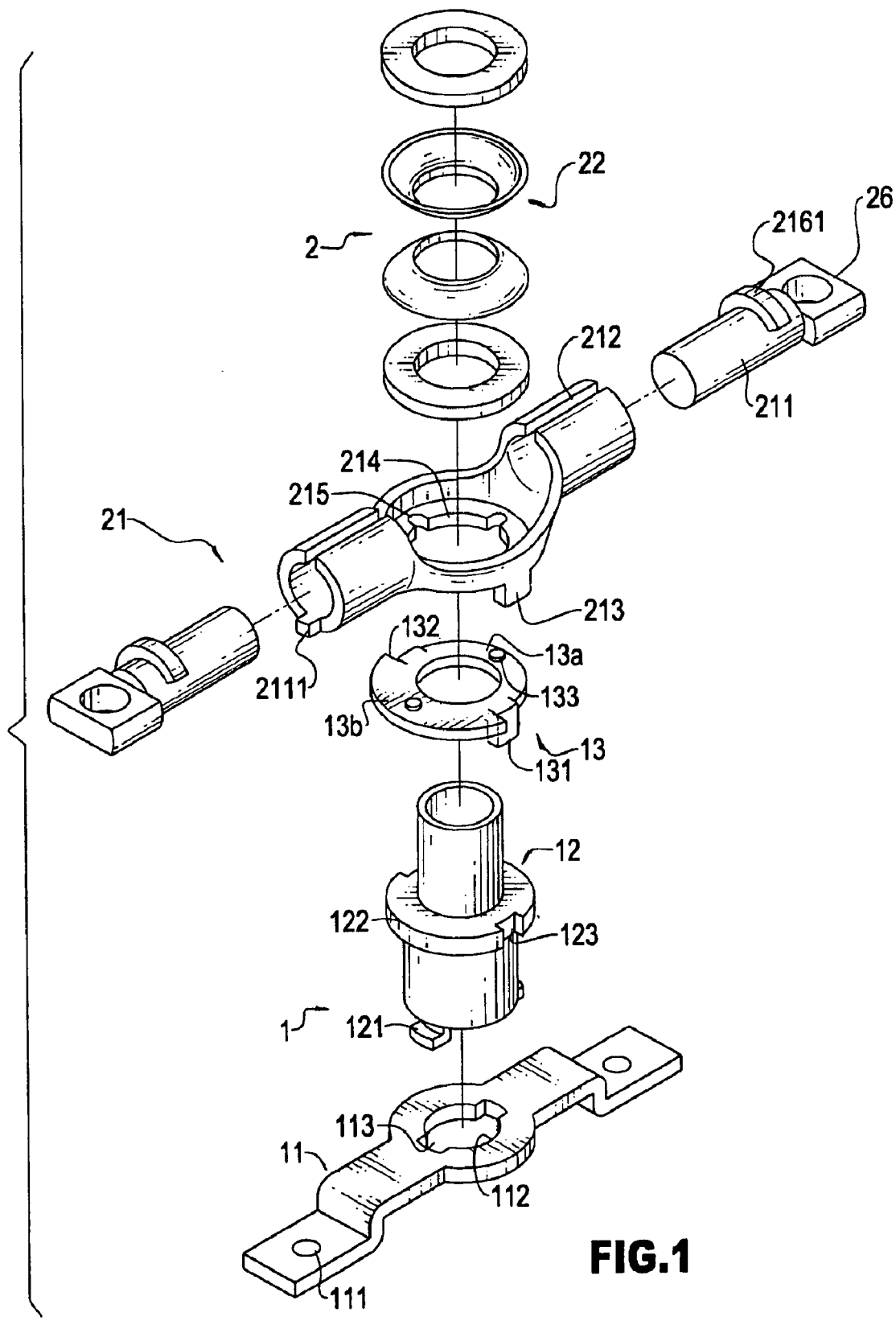
FIG. 1 is an exploded perspective view of the hinge assembly of the present invention.

With reference to FIG. 1, it is noted that the hinge assembly in accordance with the present invention is composed of a fixing seat (1) and a rotation seat (2).

The fixing seat (1) includes an elongated fixing plate (11), a rotation shaft (12) and a limiting disk (13).

The fixing plate (11) has two fixing holes (111) respectively defined in a distal end of the fixing plate (11), a first through hole (112) centrally defined in the fixing plate (11) and two cutouts (113) oppositely defined in an inner face defining the first through hole (112).

The rotation shaft (12) includes two fixing feet (121) integrally formed on a bottom face of the rotation shaft (12) to correspond to the two cutouts (113) in the first through hole (112) of the fixing plate (11), a fixing flange (122) integrally formed on a mediate portion of the rotation shaft (12) and provided with two opposite notches (123) defined in an outer face of the fixing flange (122).

The limiting disk (13) comprises two arcuate portions (13a, 13b) with the same inner diameter and different outer diameter, wherein the outer diameter of the arcuate portion (13b) is larger than that of the arcuate portion (13a). The limiting disk (13) further has two L-shaped, downwardly extending limiting legs (131) oppositely formed on a side face of the arcuate half (13a) to correspond to the two notches (123) of the rotation shaft (12), two limiting edges (132) formed on a joint between the two arcuate portions (13a,13b) and at least two bosses (133).

The rotation seat (2) has a body (21) and leaf springs (22).

The body (21) has two oppositely formed tubes (211) each with a slit (212) to allow the tube (211) to be resilient, an extension (213) extending downward to correspond to either one of the two limiting edges (132) of the limiting disk (13), a second through hole (214) defined between the two tubes (211) to correspond to the rotation shaft (12) and having at least two opposite position recesses (215) defined in an inner face defining the second through hole (214) and two connection legs (216) respectively received in a corresponding one of the two tubes (211). It is noted that each tube (211) has a limiting block (2111) formed on a distal edge of the tube (211) and the connection leg (216) has a stop (2161) formed on an outer circumference of the connection leg (216) to correspond to the limiting block (2111).

Figure 2:
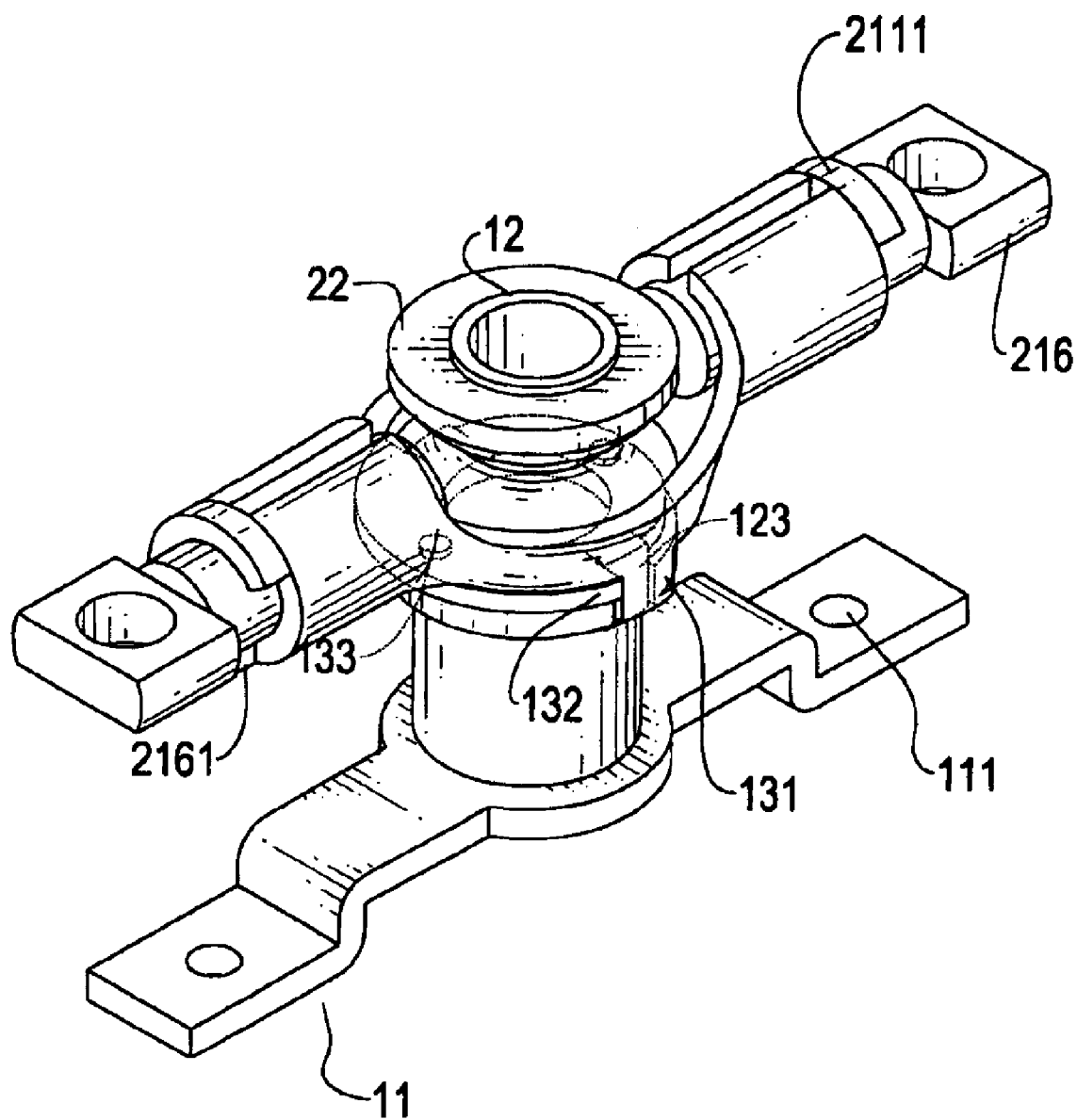
FIG. 2 is a perspective view of the assembled hinge assembly of the present invention.

With reference to FIG. 2 and still using FIG. 1 as a reference, when the hinge assembly of the present invention is in assembly, the two fixing feet (121) of the rotation shaft (12) are inserted into the corresponding cutouts (113) in the first through hole (112) of the fixing plate (11) to fix the rotation shaft (12) on the fixing plate (11). Then the rotation shaft (12) is inserted through the limiting disk (13), the second through hole (214) and the leaf springs (22), wherein the limiting legs (131) of the limiting disk (13) are inserted into the corresponding notches (123) of the limiting flange (122) on the rotation shaft (12) to position the limiting disk

(13) on the rotation shaft (12). Thereafter, the uppermost leaf spring (22) is riveted with a distal end of the rotation shaft (12) to securely sandwich the body (21) with the fixing plate (11).

After the assembly of the hinge assembly of the present invention, it is to be noted that because each connection leg (216) is inserted into the corresponding tube (211), the connection legs (216) are rotatable with respect to the body (21). However, due to the limiting block (2111) on the tube (211) and the stop (2161) on the connection leg (216), the rotation angle of the connection leg (216) is limited. Furthermore, because the rotation shaft (12) simply extends through the second through hole (214) of the body (21) and the body (21) is securely sandwiched between the leaf springs (22) and the limiting disk (13) which is securely positioned on the rotation shaft (12), the body (21) is rotatable with respect to the fixing plate (11). However, due to the provision of the extension (213) on the body (21) and the limiting edges (132), while the body (21) is rotated, the extension (213) will constantly engage with either one of the limiting edges (132) so that the rotation angle of the body (21) relative to the fixing plate (11) is limited.

Figure 3:
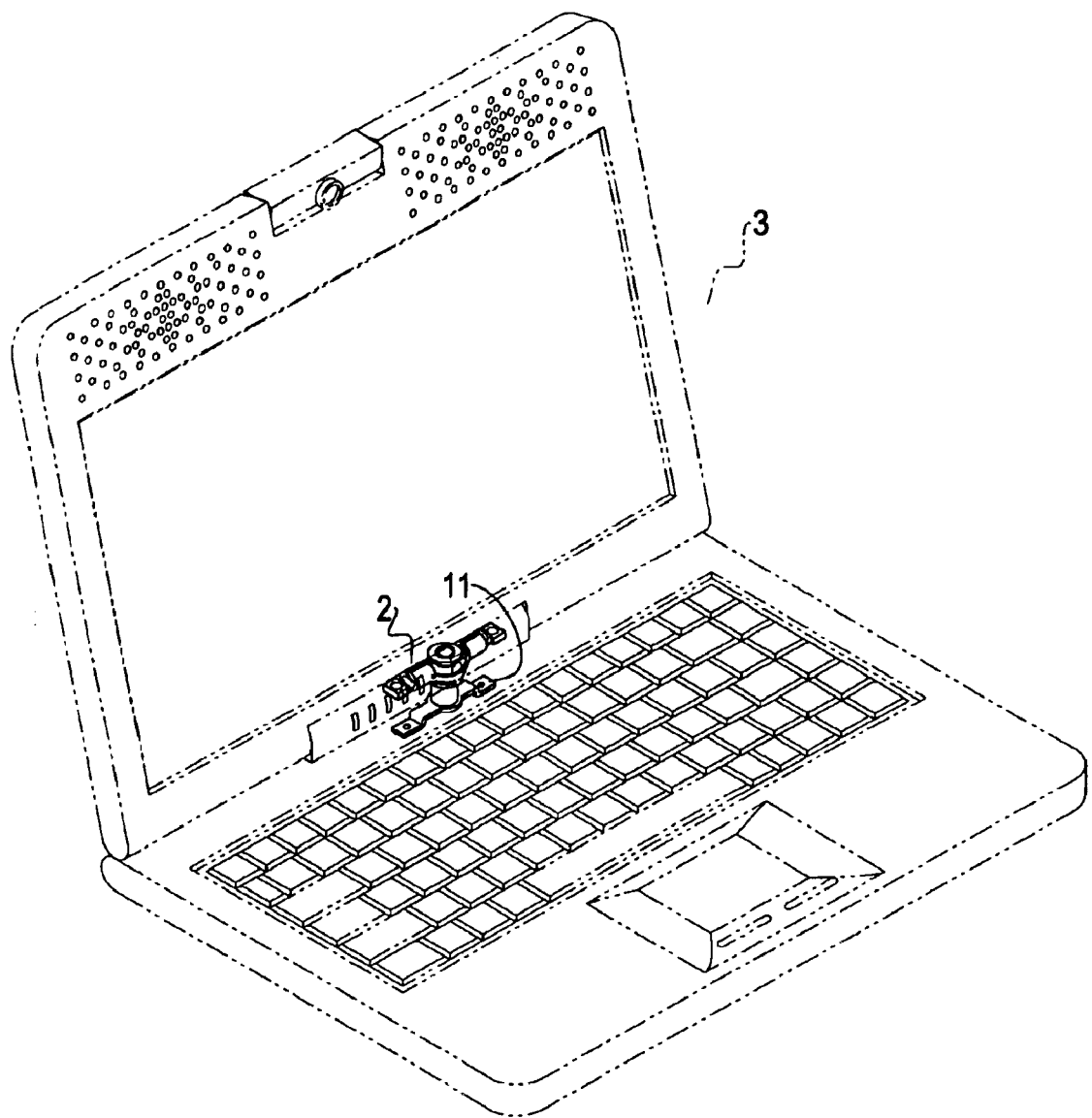
FIG. 3 is a schematic perspective view showing the application of the hinge assembly of the present invention to a laptop computer.
Figure 4:
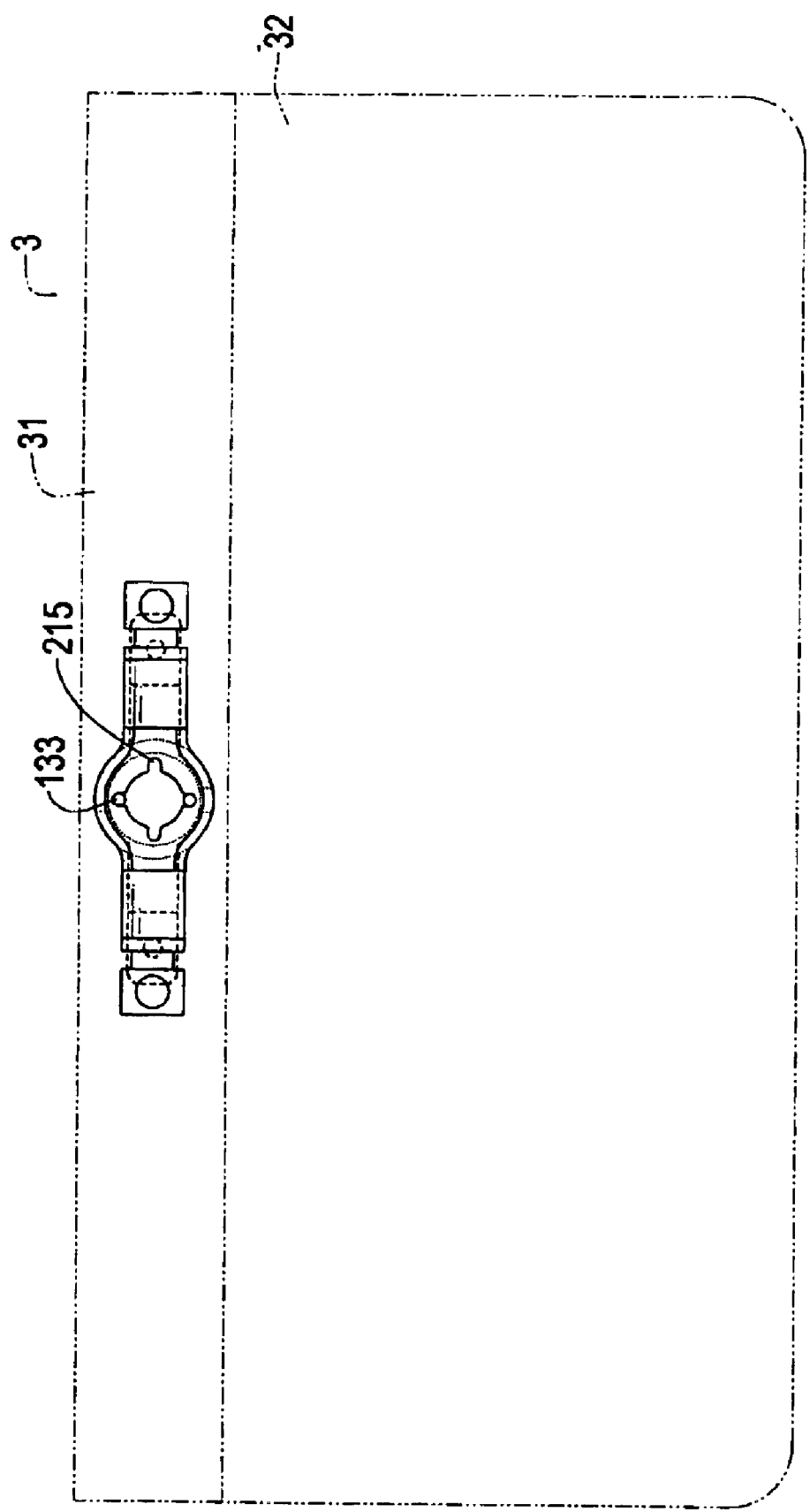
FIG. 4 is a top plan view of the application of the hinge assembly in FIG. 3.
Figure 5:
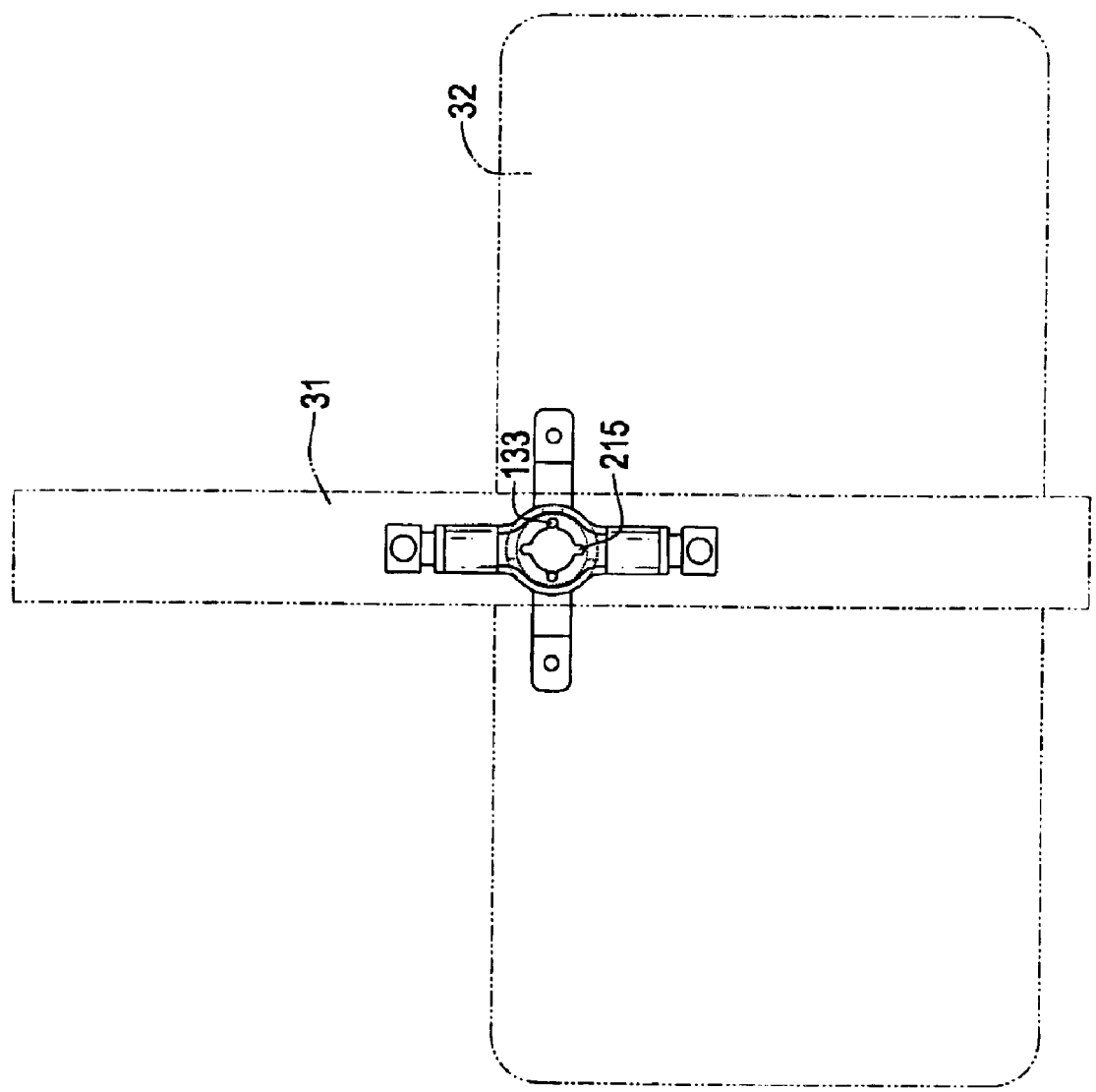
FIG. 5 is a schematic side plan view showing that the monitor of the laptop computer is able to rotate in a latitudinal direction with respect to the mainframe of the laptop computer.

With reference to FIGS. 3, 4 and 5, when the hinge assembly of the present invention is applied to a laptop computer (3) having a monitor (31) and a mainframe (32), the rotation seat (2) is connected to the monitor (31) via the connection legs ((216) and the fixing seat (32) is connected to the mainframe (32) via the fixing plate (111). Then the monitor (31) is able to rotate in a latitudinal direction relative to the mainframe (32).

Figure 6:
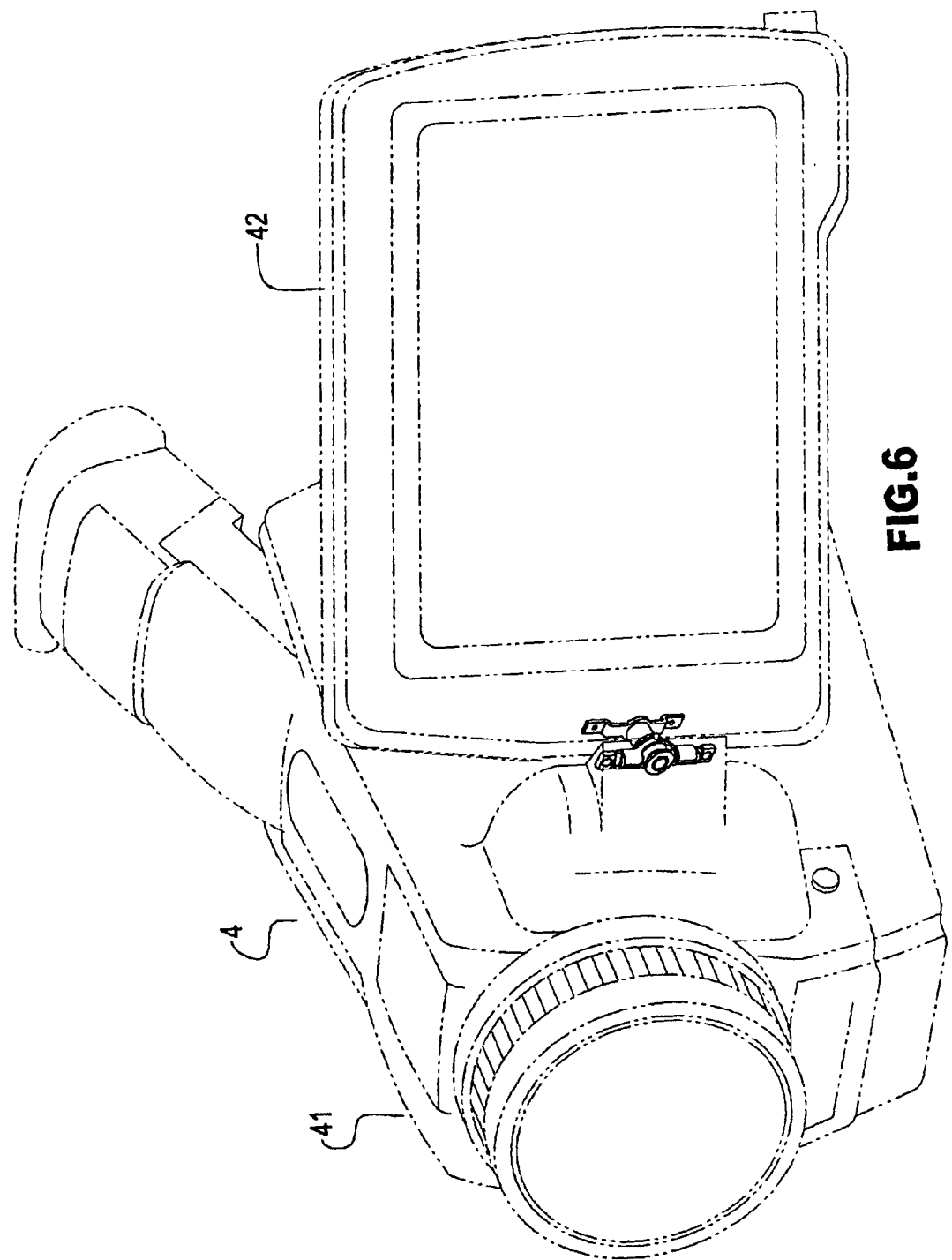
FIG. 6 is a schematic perspective view showing the application of the hinge assembly of the present invention to a camera.

With reference to FIG. 6, when the hinge assembly of the present invention is applied to a camera (4) having a mainframe (41) and a screen (42), the rotation seat (2) is connected to the mainframe (41) via the connection legs (216) and the fixing seat (1) is connected to the screen (42) via the fixing plate (11). Then the screen (42) is able to rotate in a longitudinal direction relative to the mainframe (41).

In summary, no matter the rotation seat (2) is connected to a monitor or a mainframe of an electronic device, the hinge assembly of the present invention is able to provide rotation ability to the monitor in both the latitudinal and longitudinal directions with respect to the mainframe. Furthermore, in order to protect the electronic device, the rotation angle of the monitor in relation to the mainframe of the electronic device is limited via the limiting block (2111) and the stop (2161) and the extension (213) and the limiting edges (132).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly comprising:
    a fixing seat having:
        fixing plate with a fixing hole defined in two distal ends of the fixing plate for connection to a mainframe of an electronic device;
        a rotation shaft securely connected to the fixing plate and having a limiting flange formed on a mediate portion of the rotation shaft and provided with two notches defined in an outer periphery of the limiting flange; and
        a limiting disk composed of a first arcuate portion and a second arcuate portion with an inner diameter the same as that of the first arcuate portion and an outer diameter larger than that of the first arcuate portion, the limiting disk having two limiting legs integrally extending downward to be received in the two notches of the limiting flange to position the limiting disk on the rotation shaft two limiting edges formed on a respective joint between the first and second arcuate portions; and
    a rotation seat having:
        a body rotatably mounted on the rotation shaft and having two tubes formed respectively on two opposite ends of the body, two connection legs each rotatably received in a corresponding one of the two tubes for connection to a monitor of the electronic device and an extension extending downward from a bottom face of the body to selectively engage with either one of the limiting edges of the limiting disk to limit a rotation angle of the body to the fixing plate; and
        leaf springs mounted on the rotation shaft and an uppermost leaf being riveted to a distal end of the rotation shaft to securely sandwich the body with the limiting disk.

2. The hinge assembly as claimed in claim 1, wherein the fixing plate has a first through hole centrally defined therein and having two opposite cutouts defined in an inner face defining the first through hole and the rotation shaft has two fixing feet formed on a bottom face of the rotation shaft to correspond to and be received in the two cutouts in the fixing plate to secure engagement between the rotation shaft and the fixing plate.

3. The hinge assembly as claimed in claim 2, wherein the limiting disk has at least one boss formed on a top face of the limiting disk and the body has a second through hole defined to allow extension of the rotation shaft and provided with at least two opposite position recesses to correspond to the at least one boss so that when the at least one boss is received in one of the at least two opposite position recesses, a temporary position effect is provided to the rotation seat.

4. The hinge assembly as claimed in claim 3, wherein each of the tubes has a limiting block and each of the connection legs has a stop formed to correspond to the limiting block such that rotational movement of the connection legs in relation to the tubes is limited when the stop engages with the limiting block.

5. The hinge assembly as claimed in claim 2, wherein each of the tubes has a limiting block and each of the connection legs has a stop formed to correspond to the limiting block such that rotational movement of the connection legs in relation to the tubes is limited when the stop engages with the limiting block.

6. The hinge assembly as claimed in claim 1, wherein the limiting disk has at least one boss formed on a top face of the limiting disk and the body has a second through hole defined to allow extension of the rotation shaft and provided with at least two opposite position recesses to correspond to the at least one boss so that when the at least one boss is received in one of the at least two opposite position recesses, a temporary position effect is provided to the rotation seat.

7. The hinge assembly as claimed in claim 1, wherein each of the tubes has a limiting block and each of the connection legs has a stop formed to correspond to the limiting block such that rotational movement of the connection legs in relation to the tubes are limited when the stop engages with the limiting block.

* * * * *